US010971145B2

(12) United States Patent
Luo et al.

(10) Patent No.: US 10,971,145 B2
(45) Date of Patent: Apr. 6, 2021

(54) SPEECH INTERACTION FEEDBACK METHOD FOR SMART TV, SYSTEM AND COMPUTER READABLE MEDIUM (71) Applicant: BAIDU ONLINE NETWORK TECHNOLOGY (BEIJING) CO., LTD., Beijing (CN)

(72) Inventors: Junnan Luo, Beijing (CN); Jing Li, Beijing (CN); Zhixi Chen, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 221 days.

(21) Appl. No.: 16/179,436

(22) Filed: Nov. 2, 2018

(65) Prior Publication Data
US 2019/0279628 A1  Sep. 12, 2019

(30) Foreign Application Priority Data

Mar. 9, 2018  (CN) .......................... 201810195553.5

(51) Int. Cl.
*G06F 3/16* (2006.01)
*G10L 15/22* (2006.01)
(Continued)

(52) U.S. Cl.
CPC .............. *G10L 15/22* (2013.01); *G06F 3/167* (2013.01); *G10L 15/1815* (2013.01);
(Continued)

(58) Field of Classification Search
CPC .......... G10L 15/30; G10L 15/26; G06F 3/167
See application file for complete search history.

(56) References Cited

U.S. PATENT DOCUMENTS 8,793,138 B2 * 7/2014 Cho .................... G10L 15/22
                                                                704/275
2005/0102142 A1 * 5/2005 Soufflet ................... G10L 15/18
                                                                704/246
(Continued)

FOREIGN PATENT DOCUMENTS

CN  102395013 A  3/2012
CN  105453025 A  3/2016
(Continued)

OTHER PUBLICATIONS

First Office Action and Search Report from CN app. No. 201810195553.5, dated Mar. 15, 2019, with English translation from Global Dossier.

(Continued)

*Primary Examiner* — Feng-Tzer Tzeng
(74) *Attorney, Agent, or Firm* — Ladas & Parry, LLP (57) ABSTRACT The present disclosure provides a speech interaction feedback method for smart TV, a system and a computer readable medium. The method comprises: collecting audio stream of a speech query sent by a user and element information of a current interface of the smart TV; sending the audio stream and the element information of the current interface to a cloud server so that the cloud server generates an information response message carrying a target element, according to the audio stream and the element information of the current interface; wherein the target element is an element in the current interface hit by an intention of the speech query corresponding to the audio stream; receiving the response message returned by the cloud server; according to information of the target element in the response message, performing a preset effect display for the corresponding target element on the current interface, as an interaction feedback for the speech query. According to the technical solution of the present disclosure, it is possible to perform (Continued)

feedback for the user's speech query on the smart TV. As such, when the smart TV does not execute the control instruction, it is possible to accurately determine whether a reason for none execution of the control instruction is none recognition or blockage during execution.

15 Claims, 4 Drawing Sheets

(51) Int. Cl.
  *G10L 15/18* (2013.01)
  *H04N 21/24* (2011.01)
  *H04N 21/439* (2011.01)
  *H04N 21/472* (2011.01)
  *G10L 15/00* (2013.01)
  *G10L 15/30* (2013.01)
  *G10L 15/26* (2006.01)

(52) U.S. Cl.
  CPC ..... *H04N 21/2401* (2013.01); *H04N 21/4394* (2013.01); *H04N 21/472* (2013.01); *G10L 15/00* (2013.01); *G10L 15/26* (2013.01); *G10L 15/30* (2013.01); *G10L 2015/225* (2013.01)

(56) References Cited

U.S. PATENT DOCUMENTS

| | | | | |
|---|---|---|---|---|
| 2008/0100747 A1* | 5/2008 | Lin | .......................... | H04N 5/44 348/553 |
| 2010/0057470 A1* | 3/2010 | Silvera | .................... | G10L 15/26 704/275 |
| 2010/0312547 A1* | 12/2010 | Van Os | .................... | G06F 3/167 704/9 |
| 2013/0218563 A1* | 8/2013 | Basir | ....................... | G10L 15/28 704/254 |
| 2013/0231937 A1* | 9/2013 | Woodall | .................. | G06F 3/013 704/275 |

FOREIGN PATENT DOCUMENTS

| | | |
|---|---|---|
| CN | 105681829 A | 6/2016 |
| CN | 105988915 A | 10/2016 |
| CN | 107608652 A | 1/2018 |
| EP | 2555537 B1 | 7/2016 |

OTHER PUBLICATIONS

Second Office Action from CN app. No. 201810195553.5, dated May 31, 2019, with English translation from Global Dossier.

* cited by examiner

SPEECH INTERACTION FEEDBACK METHOD FOR SMART TV, SYSTEM AND COMPUTER READABLE MEDIUM

The present application claims the priority of Chinese Patent Application No. 201810195553.5, filed on Mar. 9, 2018, with the title of "Speech interaction feedback method for smart TV, system and computer readable medium". The disclosure of the above application is incorporated herein by reference in its entirety.

FIELD OF THE DISCLOSURE

The present disclosure relates to the technical field of computer application, and particularly to a speech interaction feedback method for smart TV, a system and a computer readable medium.

BACKGROUND OF THE DISCLOSURE

As speech technologies develop, there are more and more scenarios of using speech to enhance the user's interaction experience under the TV scenario. However, a control-type speech query issued by the user undergoes, from issuance to execution, several phases such as wakeup, Automatic Speech Recognition (ASR), Natural Language Understanding (NLU), and instruction reception and execution by the smart TV. An excellent feedback mechanism may advise the user of an execution state of the speech query in real time, and achieve an effect of enhancing experience. For example, at present, during execution of the steps wakeup, ASR and NLU, the smart TV has corresponding feedback.

For example, a current speech interaction feedback process for smart TV may specifically include the following steps: the user sends a control-type speech query, the smart TV collects the user's audio stream of the user's query and sends it to a cloud server, the cloud server performs ASR recognition for the query, NLU understands an intention of the query, judges slot information of the Query, and finally sends the corresponding intention and slot information to the smart TV, and finally the smart TV directly executes a control instruction corresponding to the corresponding intention and slot information.

However, in the prior art, there is not any feedback information during the procedure in which the smart TV receives the intention and slot information corresponding to the speech query until the corresponding control instruction is executed. As such, when the smart TV does not execute the control instruction, it is impossible to determine whether the cloud server does not recognize the speech query or the smart TV's execution of the control instruction is blocked, namely, a reason causing none execution of the control instruction cannot be accurately determined.

SUMMARY OF THE DISCLOSURE

The present disclosure provides a speech interaction feedback method for smart TV, a system and a computer readable medium, to perform corresponding feedback for the user's speech query, and facilitate determination of a reason for failure to execute a control instruction when the smart TV does not execute the control instruction.

The present disclosure provides a speech interaction feedback method for smart TV, the method comprising:
  collecting audio stream of a speech query sent by a user and element information of a current interface of the smart TV;
  sending the audio stream and the element information of the current interface to a cloud server so that the cloud server generates an information response message carrying a target element, according to the audio stream and the element information of the current interface; wherein the target element is an element in the current interface hit by an intention of the speech query corresponding to the audio stream;
  receiving the response message returned by the cloud server;
  according to information of the target element in the response message, performing a preset effect display for the corresponding target element on the current interface, as an interaction feedback for the speech query.

Further optionally, in the abovementioned method, after collecting audio stream of a speech query sent by the a and element information of a current interface of the smart TV, the method further comprises:
  storing the element information of the current interface in a buffer;
  the step of, according to information of the target element in the response message, performing a preset effect display for the corresponding target element on the current interface specifically comprises:
  looking up the element information of the current interface stored in the buffer for the corresponding target element, according to information of the target element in the response message;
  performing a preset effect display for the corresponding target element in the current interface.

Further optionally, in the above method, the element information of the current interface comprises a position, displayed words and hierarchical structure information of the element in the current interface.

The present disclosure further provides a speech interaction feedback method for smart TV, the method comprising:
  receiving audio stream corresponding to a user's speech query and element information of a current interface of the smart TV sent by the smart TV;
  generating an information response message carrying a target element, according to the audio stream and the element information of the current interface; wherein the target element is an element in the current interface hit by an intention of the speech query corresponding to the audio stream;
  returning the response message to the smart TV so that the smart TV, according to information of the target element in the response message, performs a preset effect display for the corresponding target element on the current interface, as an interaction feedback for the speech query.

Further optionally, in the above-mentioned method, the generating an information response message carrying a target element, according to the audio stream and the element information of the current interface specifically comprises:
  according to audio stream and the element information of the current interface, recognizing a target element in the current interface hit by an intention of the speech query corresponding to the audio stream;
  generating the response message based on information of the target element.

Further optionally, in the abovementioned method, the step of, according to audio stream and the element information of the current interface, recognizing a target element in the current interface hit by an intention of the speech query corresponding to the audio stream specifically comprises:

performing speech recognition for the audio stream to obtain a word instruction corresponding to the speech query corresponding to the audio stream;
  performing natural language understanding processing for the word instruction and recognizing an intention of the speech query;
  comparing the intention of the speech query with the element information of the current interface, and recognizing the target element in the current interface hit by the intention of the speech query.

Further optionally, in the abovementioned method, the element information of the current interface comprises a position, displayed words and hierarchical structure information of the element in the current interface.

The present disclosure provides a smart TV apparatus, comprising:

a collecting module configured to collect audio stream of a speech query sent by the a and element information of a current interface of the smart TV;
  a transceiving module configured to send the audio stream and the element information of the current interface to a cloud server so that the cloud server generates an information response message carrying a target element, according to the audio stream and the element information of the current interface; wherein the target element is an element in the current interface hit by an intention of the speech query corresponding to the audio stream;
  the transceiving module further configured to receive the response message returned by the cloud server;
  an executing module configured to, according to information of the target element in the response message, perform a preset effect display for the corresponding target element on the current interface, as an interaction feedback for the speech query.

Further optionally, the above apparatus further comprises:

a storage module configured to store the element information of the current interface in a buffer;
  the executing module is specifically configured to:
  look up the element information of the current interface stored in the buffer for the corresponding target element, according to information of the target element in the response message;
  perform a preset effect display for the corresponding target element in the current interface.

Further optionally, in the above apparatus, the element information of the current interface comprises a position, displayed words and hierarchical structure information of the element in the current interface.

The present disclosure further provides a cloud server, comprising:

a transceiving module configured to receive audio stream corresponding to a user's speech query and element information of a current interface of the smart TV sent by the smart TV;
  a generating module configured to generate an information response message carrying a target element, according to the audio stream and the element information of the current interface; wherein the target element is an element in the current interface hit by an intention of the speech query corresponding to the audio stream;
  the transceiving module further configured to return the response message to the smart TV so that the smart TV, according to information of the target element in the response message, performs a preset effect display for the corresponding target element on the current interface, as an interaction feedback for the speech query.

Further optionally, in the above-mentioned server, the generating module comprises:

a recognizing unit configured to, according to audio stream and the element information of the current interface, recognize a target element in the current interface hit by an intention of the speech query corresponding to the audio stream;
  a generating unit configured to generate the response message based on information of the target element.

Further optionally, in the abovementioned server, the recognizing unit is specifically configured to:

perform speech recognition for the audio stream to obtain a word instruction corresponding to the speech query corresponding to the audio stream;
  perform natural language understanding processing for the word instruction and recognize an intention of the speech query;
  compare the intention of the speech query with the element information of the current interface, and recognize the target element in the current interface hit by the intention of the speech query.

Further optionally, in the abovementioned server, the element information of the current interface comprises a position, displayed words and hierarchical structure information of the element in the current interface.

The present disclosure further provides a speech interaction system for smart TV, the system comprising a smart TV apparatus and a cloud server, the smart TV apparatus is communicatively connected with the cloud server, the smart TV apparatus employs the aforesaid smart TV apparatus, and the cloud server employs the aforesaid cloud server.

The present disclosure further provides a computer device, the device comprising:

one or more processors;
  a storage for storing one or more programs;
  the one or more programs, when executed by said one or more processors, enable said one or more processors to implement the abovementioned speech interaction feedback method for smart TV.

The present disclosure further provides a computer readable medium on which a computer program is stored, the program, when executed by a processor, implementing the aforesaid speech interaction feedback method for smart TV.

According to the speech interaction feedback method for smart TV, the system and the computer readable medium of the present disclosure, it is possible to perform feedback for the user's speech query on the smart TV. As such, when the smart TV does not execute the control instruction, it is possible to accurately determine that the cloud server does not recognize the speech query or the control instruction is blocked when executed by the smart TV. Furthermore, in the present embodiment, it is further possible to effectively improve the user's experience degree by performing feedback for the user's speech query through the preset effect.

DETAILED DESCRIPTION OF PREFERRED EMBODIMENTS

The present disclosure will be described in detail with reference to figures and specific embodiments to make objectives, technical solutions and advantages of the present disclosure more apparent.

Figure 1:
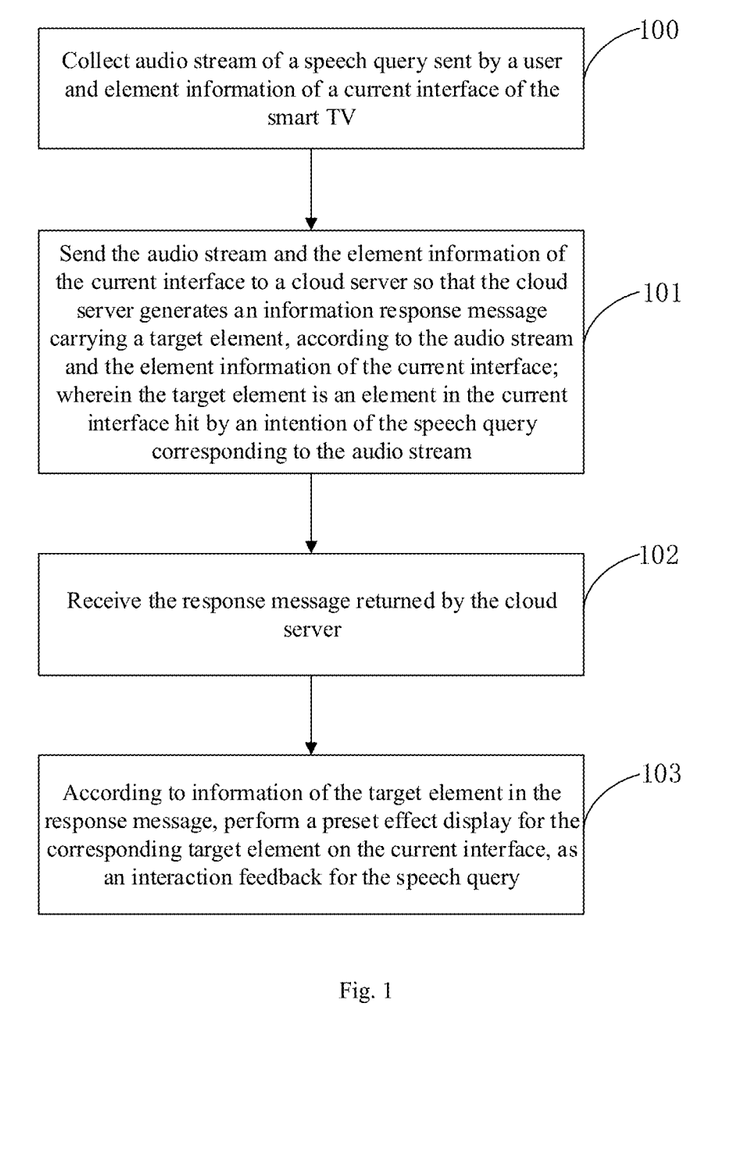
FIG. 1 is a flow chart of Embodiment 1 of a speech interaction feedback method for smart TV according to the present disclosure.

FIG. 1 is a flow chart of Embodiment 1 of a speech interaction feedback method for smart TV according to the present disclosure. As shown in FIG. 1, the speech interaction feedback method for smart TV according to the present embodiment may specifically include the following steps:

100: collecting audio stream of a speech query sent by a user and element information of a current interface of the smart TV;

According to the speech interaction feedback method for smart TV of the present embodiment, the technical solution of the present disclosure is described on the smart TV side. The smart TV of the present embodiment not only includes a client of the smart TV but also includes an entity of the smart TV. For example, the smart TV speech interface feedback of the smart TV is specifically implemented by the client of the smart TV and the entity of the smart TV in cooperation.

For example, in the present embodiment, the client of the smart TV may invoke a microphone device carried by the smart TV itself or externally connected to collect the audio stream of the user's speech. When the user sends a speech query, the smart TV may collect the audio stream corresponding to the speech query. In addition, since the user's speech queries are all made with respect to the content displayed on the current interface. Therefore, in the present embodiment, the smart TV further needs to collect element information of the current interface of the smart TV, for example, specifically the client of the smart TV collects the element information currently displayed on the current interface on a display screen of the entity of the smart TV.

Optionally, the element information of the current interface of the present embodiment may include a position, displayed words and hierarchical structure information of the element in the current interface, and information of each element of the current interface may solely identify the element in the current interface. In the present embodiment, the position of the element may be represented with coordinates of the element in the current interface.

101: sending the audio stream and the element information of the current interface to the cloud server so that the cloud server generates an information response message carrying a target element, according to the audio stream and the element information of the current interface; wherein the target element is an element in the current interface hit by an intention of the speech query corresponding to the audio stream;

Specifically, the client of the smart TV may send the audio stream and element information of the current interface to the cloud server via an http protocol. For example, currently smart TVs are mostly based on an Android system. It is possible to, through an interface provided in an Android system, collect and obtain positions of all elements on the current interface, displayed words and hierarchical structure. It is possible to finally determine all elements on the current interface to which the speech query can respond, by performing analysis for the obtained information. When all element information is determined, the client of the smart TV reports information of all elements to the cloud server in a protocol format, through a protocol and interface agreed with a backend cloud server.

After the smart TV sends the audio stream and element information of the current interface to the cloud server, the cloud server may understand the intention corresponding to the speech query in the user's audio stream through steps such as ASR and NLU. Since while the user views TV programs, the speech querys are all sent with respect to the information displayed by the current interface. For example, when the current interface has a play button or a pause button, the user may send a play instruction or a pause instruction in speech. As such, after understanding the user's intention through ASR and NLU, the cloud server may play or pause upon determining the control instruction corresponding to the user's speech query. Meanwhile, since the cloud server already obtains the element information of the current interface, it is possible to recognize a target element in the current interface hit by an intention of the speech query corresponding to the audio stream according to the intention of the speech query in the audio stream and the element information of the current interface, thereby generating an information response message carrying the target element. For example, the target element is an element in the current interface whose displaying word is pause or play.

102: receiving a response message returned by the cloud server;

103: according to information of the target element in the response message, performing a preset effect display for the corresponding target element on the current interface, as an interaction feedback for the speech query.

In the present embodiment, the information received by the smart TV and carrying the target element in the response message returned by the cloud server is for example a position of the target element, a word displayed by the target element and a hierarchical structure of the target element in the current interface. After the smart TV receives the response from the server, the client of the smart TV parses the response message according an agreed protocol. If it is found after the parsing that the response message includes hitting content related to the target element of the current interface, the information of the target element is transferred to a User Interface (UI) module in the client of the smart TV for processing. Correspondingly, after receiving the information of the target element, the UI module obtains all element information of the current interface, obtains the corresponding target element in all element information of the current interface according to the position of the hit target element, the displayed word and hierarchical structure, and performs the preset effect display for the corresponding target element so that the target element in the current interface is displayed according to the preset effect on a display screen of an entity of the smart TV, as the interaction feedback for the speech query. The preset effect display of the present embodiment may be animated effect display such as enlarging, flashing, obtaining a focus or pressing a simulation button.

Furthermore, in the present embodiment, after collecting the element information of the current interface of the smart TV, it is further possible to store the element information of the current interface in the client's buffer to subsequently perform quick lookup. For example, at the side of cloud server, the UI module, after receiving the information of the target element, looks up all element information of the current interface stored in the buffer of the smart TV client for a corresponding target element, according to the position of the hit target element, the displayed word and hierarchical structure, and then perform the preset effect display for the target element, and displays on the display screen of the entity of the TV set. As compared with the above technical solution, it is unnecessary to obtain the element information of the current interface, and possible to quickly find the target element directly according to the element information of the current interface stored in the buffer, shorten the lookup duration and improve the lookup efficiency.

For example, a typical scenario is: a user sends a speech query "play" on a movie detail page of the smart TV, the smart TV, after receiving the speech query, obtains and sends the audio stream of the speech query and the element information of the current interface to the cloud server, the cloud server performs ASR and NLU processing and then understands that the user's intention is play, and looks up to find that the user's intention hits a play button of the current interface, namely, the movie detail page, and feeds back the response message carrying the element information of the play button to the smart TV. The smart TV may, according to the element information of the play button in the response message, perform the preset effect display such as enlarging, flashing, obtaining the focus or pressing the simulation button for the play button in the current interface to respond to the user's speech query. As such, subsequently even though the play operation is not executed, the user may also know that the speech query has already been understood, and the only thing is that the speech query is blocked during execution. If the smart TV does not perform the preset effect display, this indicates that the speech query is not understood. The technical solution of the present embodiment may be employed to perform accurate determination of the reason for failure to execute when the smart TV does not execute the user's speech query. Furthermore, it is further possible to effectively improve the user's experience degree by performing feedback for the user's speech query through the preset effect.

According to the speech interaction feedback method for smart TV of the present embodiment, it is possible to collect audio stream of a speech query sent by the user and element information of a current interface of the smart TV; send the audio stream and the element information of the current interface to the cloud server so that the cloud server generates an information response message carrying a target element, according to the audio stream and the element information of the current interface; wherein the target element is an element in the current interface hit by an intention of the speech query corresponding to the audio stream; receive a response message returned by the cloud server; according to information of the target element in the response message, perform a preset effect display for the corresponding target element on the current interface, as an interaction feedback for the speech query. According to the technical solution of the present embodiment, it is possible to perform feedback for the user's speech query on the smart TV. As such, when the smart TV does not execute the control instruction, it is possible to accurately determine that the cloud server does not recognize the speech query or the control instruction is blocked when executed by the smart TV. Furthermore, in the present embodiment, it is further possible to effectively improve the user's experience degree by performing feedback for the user's speech query through the preset effect.

Figure 2:
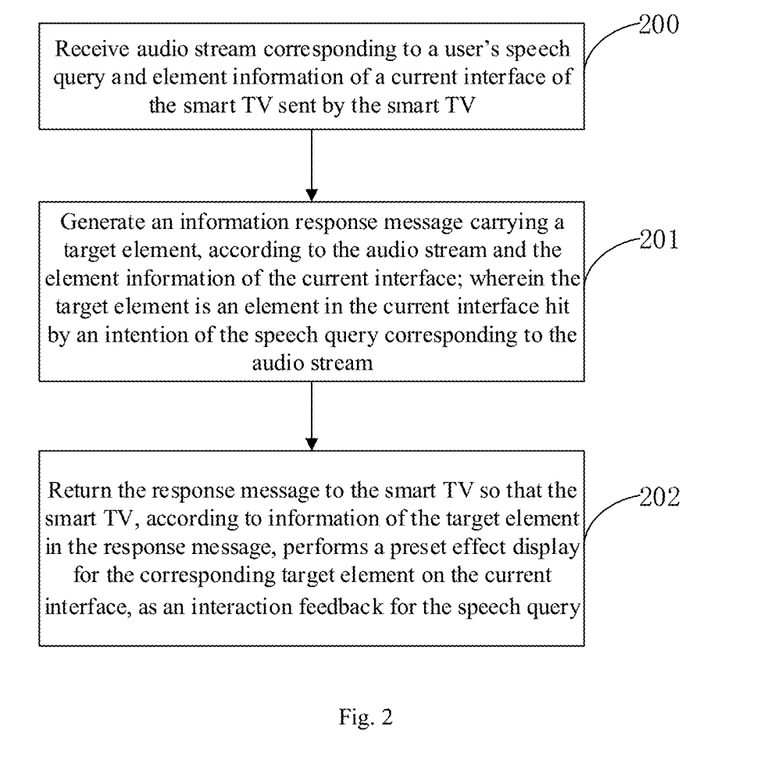
FIG. 2 is a flow chart of Embodiment 2 of a speech interaction feedback method for smart TV according to the present disclosure.

FIG. 2 is a flow chart of Embodiment 2 of a speech interaction feedback method for smart TV according to the present disclosure. As shown in FIG. 2, the speech interaction feedback method for smart TV according to the present embodiment may specifically include the following steps:

200: receiving audio stream corresponding to a user's speech query and element information of a current interface of the smart TV sent by the smart TV;

201: generating an information response message carrying a target element, according to the audio stream and the element information of the current interface; wherein the target element is an element in the current interface hit by an intention of the speech query corresponding to the audio stream;

202: returning the response message to the smart TV so that the smart TV, according to information of the target element in the response message, performs a preset effect display for the corresponding target element on the current interface, as an interaction feedback for the speech query.

For example, the element information of the current interface of the present embodiment may include a position, displayed words and hierarchical structure information of the element in the current interface.

Further optionally, the step 201 "generating an information response message carrying a target element, according to the audio stream and the element information of the current interface" in the present embodiment may specifically comprise the following steps:

(a1) according to audio stream and the element information of the current interface, recognizing a target element in the current interface hit by an intention of the speech query corresponding to the audio stream;

Further optionally, the step (a1) may specifically comprise the following steps:

(a2) performing ASR recognition for the audio stream to obtain a word instruction corresponding to the speech query corresponding to the audio stream;

(b2) performing NLU processing for the word instruction and recognizing an intention of the speech query;

(c2) comparing the intention of the speech query with the element information of the current interface, and recognizing the target element in the current interface hit by an intention of the speech query.

(b1) generating the response message based on information of the target element.

Specifically, in the present embodiment, after receiving the audio stream sent from the smart TV, the cloud server submits the audio stream to an ASR engine, ASR converts the user's speech into words, namely, coverts the speech query in the audio stream into words. It needs to be appreciated that when the ASR engine recognizes that the user stops speaking, the cloud server further needs to send the smart TV an instruction of stopping speech recording, and let the client of the smart TV stop sending the audio steam. After the ASR in the cloud server finishes converting all words in the speech query of the audio stream, the generated word information is submitted to the NLU module for processing.

The NLU module analyzes word information, recognizes the intention corresponding to the user's speech query, and meanwhile compares with the element information of the current interface sent by the smart TV. If the intention corresponding to user's speech query completely hits a certain target element in the current interface, all information corresponding to the target element such as a position, displayed words and hierarchical structure is added to the response message. Certainly, in practical application, the cloud server may further generate a complete response message through some other processing, and send the response message to the client of the smart TV through an http link so that the smart TV performs the preset effect display for the corresponding target element on the current interface according to the information of the target element in the response message, as the interaction feedback for the speech query.

The speech interaction feedback method for smart TV of the present embodiment differs from the embodiment shown in FIG. 1 in that the embodiment shown in FIG. 1 describes the technical solution of the present disclosure at the side of the smart TV, whereas the present embodiment describes the technical solution of the present disclosure at the side of the cloud server. Specific implementation of the method of the present embodiment will not be detailed any more here, and reference may be made to depictions of the embodiment shown in FIG. 1.

According to the speech interaction feedback method for smart TV of the present embodiment, it is possible to receive audio stream corresponding to a user's speech query and element information of a current interface of the smart TV sent by the smart TV; generate an information response message carrying a target element, according to the audio stream and the element information of the current interface; wherein the target element is an element in the current interface hit by an intention of the speech query corresponding to the audio stream; return the response message to the smart TV so that the smart TV, according to information of the target element in the response message, performs a preset effect display for the corresponding target element on the current interface, as an interaction feedback for the speech query. According to the technical solution of the present embodiment, it is possible to perform feedback for the user's speech query on the smart TV. As such, when the smart TV does not execute the control instruction, it is possible to accurately determine that the cloud server does not recognize the speech query or the control instruction is blocked when executed by the smart TV. Furthermore, in the present embodiment, it is further possible to effectively improve the user's experience degree by performing feedback for the user's speech query through the preset effect.

Figure 3:
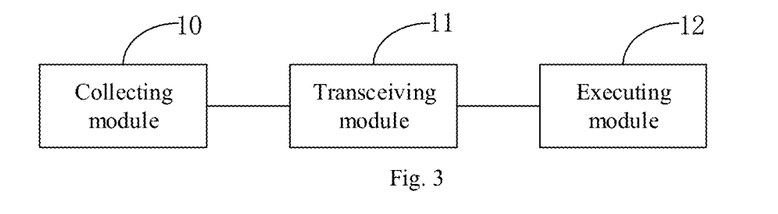
FIG. 3 is a structural diagram of Embodiment 1 of a smart TV apparatus according to the present disclosure.

FIG. 3 is a structural diagram of Embodiment 1 of a smart TV apparatus according to the present disclosure. As shown in FIG. 3, the smart TV apparatus of the present embodiment may specifically comprise:
- a collecting module 10 configured to collect audio stream of a speech query sent by the user and element information of a current interface of the smart TV;
- a transceiving module 11 configured to send the audio stream and the element information of the current interface collected by the collecting module 10 to the cloud server so that the cloud server generates an information response message carrying a target element, according to the audio stream and the element information of the current interface; wherein the target element is an element in the current interface hit by an intention of the speech query corresponding to the audio stream;
- the transceiving module 11 further configured to receive the response message returned by the cloud server;
- an executing module 12 configured to, according to information of the target element in the response message received by the transceiving module 11, perform a preset effect display for the corresponding target element on the current interface, as an interaction feedback for the speech query.

Principles employed by the smart TV apparatus according to the present embodiment to implement the speech interaction feedback method for smart TV using the above modules and the resultant technical effects are the same as those of the above-mentioned method embodiments. For particulars, please refer to the depictions of the aforesaid relevant method embodiments, and no detailed depictions will be presented here.

Figure 4:
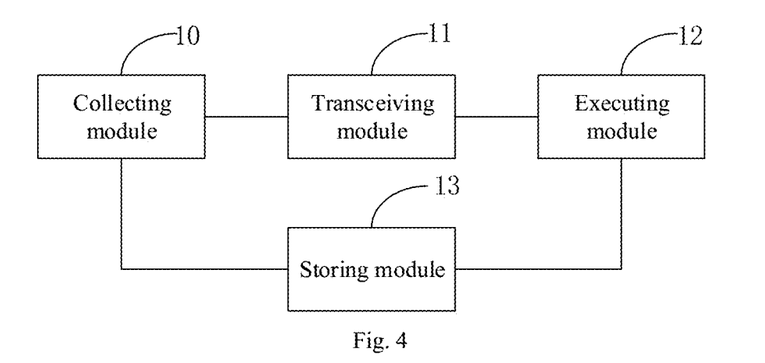
FIG. 4 is a structural diagram of Embodiment 2 of a smart TV apparatus according to the present disclosure.

FIG. 4 is a structural diagram of Embodiment 2 of a smart TV apparatus according to the present disclosure. As shown in FIG. 4, the smart TV apparatus according to the present embodiment further introduces the technical solution of the present disclosure in more detail on the basis of the technical solution of the embodiment shown in FIG. 3.

As shown in FIG. 4, the smart TV apparatus of the present embodiment may further comprise:
- a storage module 13 configured to, after the collecting module 10 collects the element information of the current interface of the smart TV, store the element information of the current interface collected by the collecting module 10 in a buffer;
- at this time, correspondingly the executing module 12 is specifically configured to:
- look up the element information of the current interface stored by the storing module 13 in the buffer for a corresponding target element, according to information of the target element in the response message received by the transceiving module 11;
- perform a preset effect display for the corresponding target element in the current interface.

Further optionally, in the smart TV apparatus of the present embodiment, the element information of the current interface comprises a position, displayed words and hierarchical structure information of the element in the current interface.

Principles employed by the smart TV apparatus according to the present embodiment to implement the speech interaction feedback method for smart TV using the above modules and the resultant technical effects are the same as those of the above-mentioned method embodiments. For particulars, please refer to the depictions of the aforesaid relevant method embodiments, and no detailed depictions will be presented here.

Figure 5:
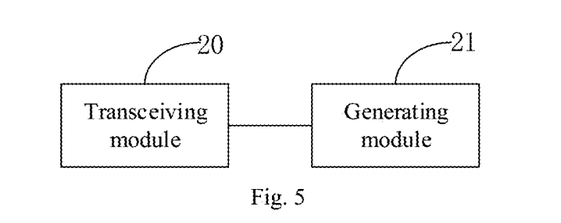
FIG. 5 is a structural diagram of Embodiment 1 of a cloud server according to the present disclosure.

FIG. 5 is a structural diagram of Embodiment 1 of a cloud server according to the present disclosure. As shown in FIG. 5, the cloud server of the present embodiment may specifically comprise:
- a transceiving module 20 configured to receive audio stream corresponding to a user's speech query and element information of a current interface of the smart TV sent by the smart TV;
- a generating module 21 configured to generate an information response message carrying a target element, according to the audio stream and the element information of the current interface received by the transceiving module 20; wherein the target element is an element in the current interface hit by an intention of the speech query corresponding to the audio stream;

the transceiving module 20 further configured to return the response message generated by the generating module 21 to the smart TV so that the smart TV, according to information of the target element in the response message, performs a preset effect display for the corresponding target element on the current interface, as an interaction feedback for the speech query.

Principles employed by the cloud server according to the present embodiment to implement the smart TV speech interaction feedback using the above modules and the resultant technical effects are the same as those of the above-mentioned method embodiments. For particulars, please refer to the depictions of the aforesaid relevant method embodiments, and no detailed depictions will be presented here.

Figure 6:
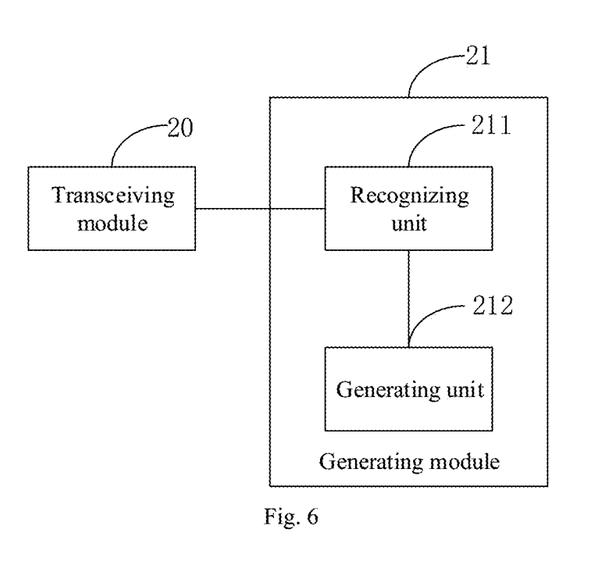
FIG. 6 is a structural diagram of Embodiment 2 of a cloud server according to the present disclosure.

FIG. 6 is a structural diagram of Embodiment 2 of a cloud server according to the present disclosure. As shown in FIG. 6, the cloud server according to the present embodiment further introduces the technical solution of the present disclosure in more detail on the basis of the technical solution of the embodiment shown in FIG. 5.

As shown in FIG. 6, in the cloud server of the present embodiment, the generating module 21 comprises:

a recognizing unit 211 configured to, according to audio stream and the element information of the current interface received by the transceiving module 20, recognize a target element in the current interface hit by an intention of the speech query corresponding to the audio stream;

a generating unit 212 configured to generate the response message based on information of the target element recognized by the recognizing unit 211.

Further optionally, in the cloud server of the present embodiment, the recognizing unit 211 is specifically configured to:

perform speech recognition for the audio stream received by the transceiving module 20 to obtain a word instruction corresponding to the speech query corresponding to the audio stream;

perform natural language understanding processing for the word instruction and recognize an intention of the speech query;

compare the intention of the speech query with the element information of the current interface, and recognize the target element in the current interface hit by an intention of the speech query.

Further optionally, in the cloud server of the present embodiment, the element information of the current interface comprises a position, displayed words and hierarchical structure information of the element in the current interface.

Principles employed by the cloud server according to the present embodiment to implement the smart TV speech interaction feedback using the above modules and the resultant technical effects are the same as those of the above-mentioned method embodiments. For particulars, please refer to the depictions of the aforesaid relevant method embodiments, and no detailed depictions will be presented here.

Figure 7:
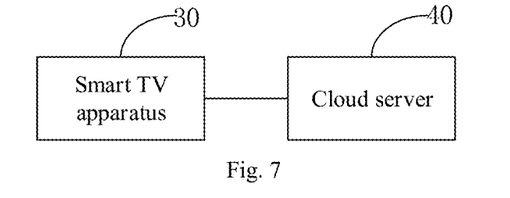
FIG. 7 is a structural diagram of a speech interaction feedback system for smart TV according to the present disclosure.

FIG. 7 is a structural diagram of a speech interaction system for smart TV according to the present disclosure. As shown in FIG. 7, the speech interaction system for smart TV of the present embodiment comprises a smart TV apparatus 30 and a cloud server 40, the smart TV apparatus 30 is communicatively connected with the cloud server 40, the smart TV apparatus 30 employs the smart TV apparatus as shown in FIG. 3 or FIG. 4, and the cloud server 40 employs the cloud server as shown in FIG. 5 or FIG. 6. Furthermore, it is specifically possible to employ the speech interaction feedback method for smart TV of the embodiment shown in FIG. 1 or FIG. 2 to implement speech interaction. For particulars, please refer to the depictions of the above relevant embodiments.

Figure 8:
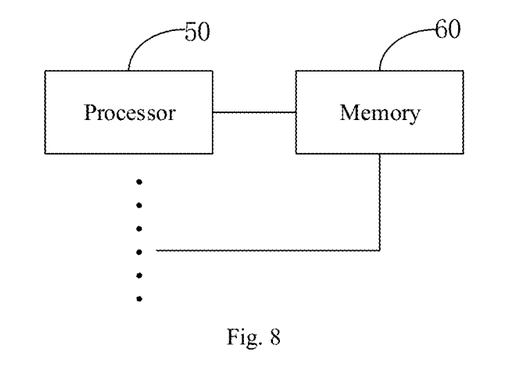
FIG. 8 is a block diagram of an embodiment of a computer device according to the present disclosure.

FIG. 8 is a block diagram of an embodiment of a computer device according to the present disclosure. As shown in FIG. 8, the computer device according to the present embodiment comprises: one or more processors 50, and a memory 60 for storing one or more programs; the one or more programs stored in the memory 60, when executed by said one or more processors 50, enable said one or more processors 50 to implement the speech interaction feedback method for smart TV in the embodiment as shown in FIG. 1 or FIG. 2. The embodiment as shown in FIG. 8 comprises a plurality of processors 50.

Figure 9:
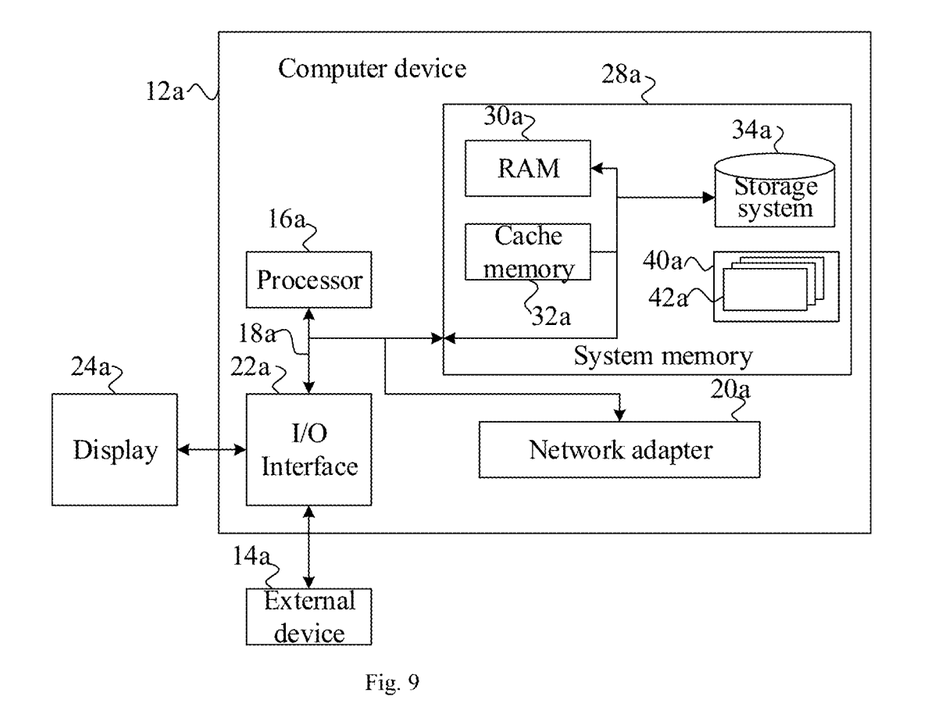
FIG. 9 is an example diagram of a computer device according to the present disclosure.

For example, FIG. 9 is an example diagram of a computer device according to an embodiment of the present disclosure. FIG. 9 shows a block diagram of an example computer device 12a adapted to implement an implementation mode of the present disclosure. The computer device 12a shown in FIG. 9 is only an example and should not bring about any limitation to the function and scope of use of the embodiments of the present disclosure.

As shown in FIG. 9, the computer device 12a is shown in the form of a general-purpose computing device. The components of computer device 12a may include, but are not limited to, one or more processors 16a, a system memory 28a, and a bus 18a that couples various system components including the system memory 28a and the processors 16a.

Bus 18a represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer device 12a typically includes a variety of computer system readable media. Such media may be any available media that is accessible by computer device 12a, and it includes both volatile and non-volatile media, removable and non-removable media.

The system memory 28a can include computer system readable media in the form of volatile memory, such as random access memory (RAM) 30a and/or cache memory 32a. Computer device 12a may further include other removable/non-removable, volatile/non-volatile computer system storage media. By way of example only, storage system 34a can be provided for reading from and writing to a non-removable, non-volatile magnetic media (not shown in FIG. 9 and typically called a "hard drive"). Although not shown in FIG. 9, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18a by one or more data media interfaces. The system memory 28a may include at least one program product having a set (e.g., at least one) of program modules that are configured to carry out the functions of embodiments shown in FIG. 1, FIG. 3 and FIG. 4 of the present disclosure, or the functions of embodiments shown in FIG. 2, FIG. 5 and FIG. 6 of the present disclosure.

Program/utility 40a, having a set (at least one) of program modules 42a, may be stored in the system memory 28a by way of example, and not limitation, as well as an operating system, one or more disclosure programs, other program modules, and program data. Each of these examples or a certain combination thereof might include an implementation of a networking environment. Program modules 42a generally carry out the functions and/or methodologies of embodiments shown in FIG. 1, FIG. 3 and FIG. 4 of the present disclosure; or carry out the functions and/or methodologies of embodiments shown in FIG. 2, FIG. 5 and FIG. 6 of the present disclosure.

Computer device 12a may also communicate with one or more external devices 14a such as a keyboard, a pointing device, a display 24a, etc.; with one or more devices that enable a user to interact with computer device 12a; and/or with any devices (e.g., network card, modem, etc.) that enable computer device 12a to communicate with one or more other computing devices. Such communication can occur via Input/Output (I/O) interfaces 22a. Still yet, computer device 12a can communicate with one or more networks such as a local area network (LAN), a general wide area network (WAN), and/or a public network (e.g., the Internet) via network adapter 20a. As depicted in FIG. 9, network adapter 20a communicates with the other communication modules of computer device 12a via bus 18a. It should be understood that although not shown, other hardware and/or software modules could be used in conjunction with computer device 12a. Examples, include, but are not limited to: microcode, device drivers, redundant processing units, external disk drive arrays, RAID systems, tape drives, and data archival storage systems, etc.

The processor 16a executes various function applications and data processing by running programs stored in the system memory 28a, for example, implements the speech interaction feedback method for smart TV as shown in the above embodiments.

The present disclosure further provides a computer readable medium on which a computer program is stored, the program, when executed by a processor, implementing the speech interaction feedback method for smart TV as shown in the above embodiments.

The computer readable medium of the present embodiment may include RAM30a, and/or cache memory 32a and/or a storage system 34a in the system memory 28a in the embodiment shown in FIG. 9.

As science and technology develops, a propagation channel of the computer program is no longer limited to tangible medium, and it may also be directly downloaded from the network or obtained in other manners. Therefore, the computer readable medium in the present embodiment may include a tangible medium as well as an intangible medium.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A speech interaction feedback method for smart TV, wherein the method comprises:
    collecting audio stream of a speech query sent by a user and information of elements displayed on a current interface of the smart TV, wherein the elements are all elements explicitly displayed on the current interface corresponding to executable operations, and the information of the elements comprises a position, displayed words and hierarchical structure information of each element in the current interface;
    sending the audio stream and the information of elements displayed on the current interface to a cloud server;
    receiving, from the cloud server, an information response message carrying a target element, which is determined by the cloud server according to the audio stream and the information of elements displayed on the current interface; wherein the target element is an element in the current interface hit by an intention of the speech query corresponding to the audio stream; and
    according to information of the target element in the response message, performing a preset effect display for the corresponding target element on the current interface, as an interaction feedback for the speech query.

2. The method according to claim 1, wherein after collecting audio stream of a speech query sent by a user and information of elements displayed on a current interface of the smart TV, the method further comprises:
    storing the information of elements displayed on the current interface in a buffer;
    the step of, according to information of the target element in the response message, performing a preset effect display for the corresponding target element on the current interface specifically comprises:
    looking up the information of elements displayed on the current interface stored in the buffer for the corresponding target element, according to information of the target element in the response message;
    performing a preset effect display for the corresponding target element in the current interface.

3. A speech interaction feedback method for smart TV, wherein the method comprises:
    receiving audio stream corresponding to a user's speech query and information of elements displayed on a current interface of the smart TV sent by the smart TV, wherein the elements are all elements explicitly displayed on the current interface corresponding to executable operations, and the information of elements displayed on the current interface comprises a position, displayed words and hierarchical structure information of each element in the current interface;
    generating an information response message carrying a target element, according to the audio stream and the information of elements displayed on the current interface; wherein the target element is an element in the current interface hit by an intention of the speech query corresponding to the audio stream; and
    returning the response message to the smart TV so that the smart TV, according to information of the target element in the response message, performs a preset effect display for the corresponding target element on the current interface, as an interaction feedback for the speech query.

4. The method according to claim 3, wherein the generating an information response message carrying a target element, according to the audio stream and the information of elements displayed on the current interface specifically comprises:
    according to audio stream and the information of elements displayed on the current interface, recognizing a target element in the current interface hit by an intention of the speech query corresponding to the audio stream;
    generating the response message based on information of the target element.

5. The method according to claim 4, wherein the step of, according to audio stream and the information of elements displayed on the current interface, recognizing a target element in the current interface hit by an intention of the speech query corresponding to the audio stream specifically comprises:
    performing speech recognition for the audio stream to obtain a word instruction corresponding to the speech query corresponding to the audio stream;
    performing natural language understanding processing for the word instruction and recognizing an intention of the speech query;
    comparing the intention of the speech query with the information of elements displayed on the current interface, and recognizing the target element in the current interface hit by the intention of the speech query.

6. A computer device, wherein the device comprises:
    one or more processors,
    a storage for storing one or more programs,
    the one or more programs, when executed by said one or more processors, enable said one or more processors to implement a speech interaction feedback method for smart TV, wherein the method comprises:
    collecting audio stream of a speech query sent by a user and information of elements displayed on a current interface of the smart TV, wherein the elements are all elements explicitly displayed on the current interface corresponding to executable operations, and the information of the elements comprises a position, displayed words and hierarchical structure information of each element in the current interface;
    sending the audio stream and the information of elements displayed on the current interface to a cloud server;
    receiving, from the cloud server, an information response message carrying a target element, which is generated by the cloud server according to the audio stream and the information of elements displayed on the current interface; wherein the target element is an element in the current interface hit by an intention of the speech query corresponding to the audio stream; and
    according to information of the target element in the response message, performing a preset effect display for the corresponding target element on the current interface, as an interaction feedback for the speech query.

7. The computer device according to claim 6, wherein after collecting audio stream of a speech query sent by a user and information of elements displayed on a current interface of the smart TV, the method further comprises:
  storing the information of elements displayed on the current interface in a buffer;
  the step of, according to information of the target element in the response message, performing a preset effect display for the corresponding target element on the current interface specifically comprises:
  looking up the information of elements displayed on the current interface stored in the buffer for the corresponding target element, according to information of the target element in the response message;
  performing a preset effect display for the corresponding target element in the current interface.

8. A computer device, wherein the device comprises:
  one or more processors,
  a storage for storing one or more programs,
  the one or more programs, when executed by said one or more processors, enable said one or more processors to implement a speech interaction feedback method for smart TV, wherein the method comprises:
  receiving audio stream corresponding to a user's speech query and information of elements displayed on a current interface of the smart TV sent by the smart TV, wherein the elements are all elements explicitly displayed on the current interface corresponding to executable operations, and the information of elements displayed on the current interface comprises a position, displayed words and hierarchical structure information of each element in the current interface;
  generating an information response message carrying a target element, according to the audio stream and the information of elements displayed on the current interface; wherein the target element is an element in the current interface hit by an intention of the speech query corresponding to the audio stream; and
  returning the response message to the smart TV so that the smart TV, according to information of the target element in the response message, performs a preset effect display for the corresponding target element on the current interface, as an interaction feedback for the speech query.

9. The computer device according to claim 8, wherein the generating an information response message carrying a target element, according to the audio stream and the information of elements displayed on the current interface specifically comprises:
  according to audio stream and the information of elements displayed on the current interface, recognizing a target element in the current interface hit by an intention of the speech query corresponding to the audio stream;
  generating the response message based on information of the target element.

10. The computer device according to claim 9, wherein the step of, according to audio stream and the information of elements displayed on the current interface, recognizing a target element in the current interface hit by an intention of the speech query corresponding to the audio stream specifically comprises:
  performing speech recognition for the audio stream to obtain a word instruction corresponding to the speech query corresponding to the audio stream;
  performing natural language understanding processing for the word instruction and recognizing an intention of the speech query; and
  comparing the intention of the speech query with the information of elements displayed on the current interface, and recognizing the target element in the current interface hit by the intention of the speech query.

11. A speech interaction system for smart TV, wherein the system comprises a smart TV apparatus and a cloud server, the smart TV apparatus is communicatively connected with the cloud server,
  where in the smart TV apparatus comprises:
  one or more first processors,
  a first storage for storing one or more first programs,
  the one or more first programs, when executed by said one or more first processors, enable said one or more first processors to implement the followings:
  collecting audio stream of a speech query sent by a user and information of elements displayed on a current interface of the smart TV apparatus, wherein the elements are all elements explicitly displayed on the current interface corresponding to executable operations, and the information of elements displayed on the current interface comprises a position, displayed words and hierarchical structure information of each element in the current interface;
  sending the audio stream and the information of elements displayed on the current interface to the cloud server;
  receiving, from the cloud server, an information response message carrying a target element, which is generated by the cloud server according to the audio stream and the information of elements displayed on the current interface; wherein the target element is an element in the current interface hit by an intention of the speech query corresponding to the audio stream; and
  according to information of the target element in the response message, performing a preset effect display for the corresponding target element on the current interface, as an interaction feedback for the speech query,
  and wherein the cloud server comprises:
  one or more second processors,
  a second storage for storing one or more second programs,
  the one or more second programs, when executed by said one or more second processors, enable said one or more second processors to implement the followings:
  receiving the audio stream corresponding to the user's speech query and the information of elements displayed on the current interface of the smart TV apparatus sent by the smart TV apparatus;
  generating the information response message carrying the target element, according to the audio stream and the information of elements displayed on the current interface;
  returning the response message to the smart TV apparatus so that the smart TV apparatus, according to information of the target element in the response message, performs the preset effect display for the corresponding target element on the current interface, as an interaction feedback for the speech query.

12. A non-transitory computer readable medium on which a computer program is stored, wherein the program, when executed by a processor, implements a speech interaction feedback method for smart TV, wherein the method comprises:
  collecting audio stream of a speech query sent by a user and information of elements displayed on a current interface of the smart TV, wherein the elements are all elements explicitly displayed on the current interface corresponding to executable operations, and the information of elements displayed on the current interface comprises a position, displayed words and hierarchical structure information of each element in the current interface;

sending the audio stream and the information of elements displayed on the current interface to a cloud server;

receiving, from the cloud server, an information response message carrying a target element, which is generated by the cloud server according to the audio stream and the information of elements displayed on the current interface; wherein the target element is an element in the current interface hit by an intention of the speech query corresponding to the audio stream; and according to information of the target element in the response message, performing a preset effect display for the corresponding target element on the current interface, as an interaction feedback for the speech query.

13. The non-transitory computer readable medium according to claim 12, wherein after collecting audio stream of a speech query sent by a user and information of elements displayed on a current interface of the smart TV, the method further comprises:

storing the information of elements displayed on the current interface in a buffer;

the step of, according to information of the target element in the response message, performing a preset effect display for the corresponding target element on the current interface specifically comprises:

looking up the information of elements displayed on the current interface stored in the buffer for the corresponding target element, according to information of the target element in the response message;

performing a preset effect display for the corresponding target element in the current interface.

14. A non-transitory computer readable medium on which a computer program is stored, wherein the program, when executed by a processor, implements a speech interaction feedback method for smart TV, wherein the method comprises:

receiving audio stream corresponding to a user's speech query and information of elements displayed on a current interface of the smart TV sent by the smart TV, wherein the elements are all elements explicitly displayed on the current interface corresponding to executable operations, and the information of elements displayed on the current interface comprises a position, displayed words and hierarchical structure information of each element in the current interface;

generating an information response message carrying a target element, according to the audio stream and the information of elements displayed on the current interface; wherein the target element is an element in the current interface hit by an intention of the speech query corresponding to the audio stream; and returning the response message to the smart TV so that the smart TV, according to information of the target element in the response message, performs a preset effect display for the corresponding target element on the current interface, as an interaction feedback for the speech query.

15. The non-transitory computer readable medium according to claim 14, wherein the generating an information response message carrying a target element, according to the audio stream and the information of elements displayed on the current interface specifically comprises:

according to audio stream and the information of elements displayed on the current interface, recognizing a target element in the current interface hit by an intention of the speech query corresponding to the audio stream; and generating the response message based on information of the target element.

* * * * *